United States Patent
Kim et al.

(10) Patent No.: US 12,327,021 B2
(45) Date of Patent: Jun. 10, 2025

(54) MEMORY-INTERFACE CONVERTER CHIP

(71) Applicant: Samsung Electronics Co., Ltd., Suwon-si (KR)

(72) Inventors: Young deok Kim, San Jose, CA (US); Pyeongwoo Lee, Sunnyvale, CA (US); Vipin Kumar Agrawal, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/822,649

(22) Filed: Aug. 26, 2022

(65) Prior Publication Data

US 2024/0028208 A1   Jan. 25, 2024

Related U.S. Application Data

(60) Provisional application No. 63/391,844, filed on Jul. 25, 2022.

(51) Int. Cl.
  *G06F 3/06* (2006.01)

(52) U.S. Cl.
  CPC .......... *G06F 3/0613* (2013.01); *G06F 3/0629* (2013.01); *G06F 3/0679* (2013.01)

(58) Field of Classification Search
  None
  See application file for complete search history.

(56) References Cited

U.S. PATENT DOCUMENTS

| | | | |
|---|---|---|---|
| 6,633,576 B1 * | 10/2003 | Melaragni | H04L 49/9036 370/414 |
| 7,631,245 B2 | 12/2009 | Lasser | |
| 8,984,575 B2 * | 3/2015 | Frey | H04N 21/23895 725/116 |
| 9,053,008 B1 | 6/2015 | Horn et al. | |
| 9,092,393 B2 | 7/2015 | Whitefield et al. | |
| 10,063,510 B2 | 8/2018 | Franklin et al. | |

(Continued)

FOREIGN PATENT DOCUMENTS

| | | |
|---|---|---|
| CN | 102510322 B | 10/2014 |
| CN | 212724002 U | 3/2021 |

(Continued)

OTHER PUBLICATIONS

Farjadrad, R. et al., "A Bunch-of-Wires (BoW) Interface for Interchiplet Communication", Theme Article: Hot Interconnects 26, Oct. 30, 2019, pp. 15-24, IEEE Computer Society.

(Continued)

*Primary Examiner* — Kaushikkumar M Patel
(74) *Attorney, Agent, or Firm* — Lewis Roca Rothgerber Christie LLP

(57) ABSTRACT

A storage device including a memory interface chip. In some embodiments, the storage device includes: a controller integrated circuit; a first memory die; and a first converter integrated circuit, the first converter integrated circuit having a first external interface and a second external interface, the first external interface being a serial interface, the first external interface being connected to the controller integrated circuit, and the second external interface being a memory interface connecting the first converter integrated circuit to the first memory die.

19 Claims, 9 Drawing Sheets

(56) References Cited

U.S. PATENT DOCUMENTS

| | | | |
|---|---|---|---|
| 2001/0007559 A1* | 7/2001 | Le Pennec | H04L 45/00 370/408 |
| 2008/0016269 A1 | 1/2008 | Chow et al. | |
| 2014/0032814 A1 | 1/2014 | Fisher et al. | |
| 2015/0248921 A1 | 9/2015 | Chen et al. | |
| 2016/0210045 A1* | 7/2016 | Hahn | G06F 3/0659 |
| 2017/0123646 A1* | 5/2017 | Woo | G06F 3/033 |
| 2017/0212800 A1* | 7/2017 | Sharma | G06F 3/065 |
| 2017/0285992 A1 | 10/2017 | Vogt | |
| 2019/0206450 A1* | 7/2019 | Contreras | H01L 24/02 |
| 2020/0081851 A1 | 3/2020 | Mittal et al. | |
| 2020/0137161 A1* | 4/2020 | Chintada | H04L 49/356 |
| 2021/0405919 A1* | 12/2021 | K | G06F 3/0671 |
| 2022/0121611 A1 | 4/2022 | Walker et al. | |
| 2022/0121612 A1* | 4/2022 | Walker | G06F 13/374 |
| 2022/0138136 A1 | 5/2022 | Hudnall et al. | |
| 2022/0254390 A1* | 8/2022 | Gans | H03K 19/20 |
| 2023/0326867 A1* | 10/2023 | Conti | H01L 23/544 |

FOREIGN PATENT DOCUMENTS

| | | |
|---|---|---|
| CN | 112699077 A | 4/2021 |
| CN | 114036086 A | 2/2022 |
| CN | 114336197 A | 4/2022 |
| EP | 2348510 A1 | 7/2011 |
| WO | 2018049648 A1 | 3/2018 |
| WO | 2021146912 A1 | 7/2021 |

OTHER PUBLICATIONS

Mounce, G. et al., "Chiplet Based Approach for Heterogeneous Processing and Packaging Architectures", pp. 1-12, IEEE Xplore.
European Search Report for EP Application No. 23181207.4 dated Dec. 1, 2023, 11 pages.
European Office Action dated Oct. 17, 2024, issued in corresponding European Patent Application No. 23181207.4 (9 pages).

* cited by examiner

MEMORY-INTERFACE CONVERTER CHIP

CROSS-REFERENCE TO RELATED APPLICATION(S)

The present application claims priority to and the benefit of U.S. Provisional Application No. 63/391,844, filed Jul. 25, 2022, entitled "METHOD USING SERIAL-INTERFACE CHIPLET(DIE) TO CONNECT CONTROLLER AND MEDIA FOR STORAGE", the entire content of which is incorporated herein by reference.

FIELD

One or more aspects of embodiments according to the present disclosure relate to persistent storage, and more particularly to an interface chip for use in persistent storage devices.

BACKGROUND

A persistent storage device may include a controller and storage media (e.g., a plurality of memory dies in a package). Parallel connections between the controller and the memory dies may be vulnerable to skew, may consume significant amounts of chip area on the controller, and may complicate the routing of a printed circuit board to which the controller and storage media may be secured.

It is with respect to this general technical environment that aspects of the present disclosure are related.

SUMMARY

According to an embodiment of the present disclosure, there is provided a storage device, including: a controller integrated circuit; a first memory die; and a first converter integrated circuit, the first converter integrated circuit having a first external interface and a second external interface, the first external interface being a serial interface, the first external interface being connected to the controller integrated circuit, and the second external interface being a memory interface connecting the first converter integrated circuit to the first memory die.

In some embodiments, the first memory die is a NAND flash memory die.

In some embodiments, the second external interface complies with a Toggle standard or an Open NAND Flash Interface (ONFI) standard.

In some embodiments, the storage device includes a package including: the first memory die; the first converter integrated circuit; and a substrate, the first memory die and the first converter integrated circuit being secured to the substrate.

In some embodiments, the storage device further includes a wire bond, connected to the first converter integrated circuit and to the first memory die.

In some embodiments, the first external interface is a Serial Peripheral Interface (SPI) or a Peripheral Component Interconnect Express (PCIe) interface or Universal Chiplet Interconnect Express (UCIE).

In some embodiments, the first converter integrated circuit is configured to receive, at the first external interface, a packet including a packet header and a packet payload.

In some embodiments, the packet payload includes a first die payload, the first die payload including a command or data.

In some embodiments, the packet payload further includes a second die payload, interleaved with the first die payload.

In some embodiments, the packet payload further includes a third die payload, interleaved with the first die payload and the second die payload.

In some embodiments, the packet header includes and indicator signaling that the packet payload includes interleaved die payloads.

In some embodiments, the storage device further includes a second memory die, wherein the first memory die has a first die identifier and the second memory die has a second die identifier, different from the first die identifier.

In some embodiments, the packet header includes the first die identifier and the second die identifier, the first die identifier and the second die identifier signaling an order of interleaving in the packet payload.

In some embodiments, the storage device further includes: a second converter integrated circuit; and a switch, the first external interface being connected to the controller integrated circuit through the switch, and the second converter integrated circuit being connected to the controller integrated circuit through the switch.

In some embodiments, the storage device further includes a second converter integrated circuit, the second converter integrated circuit having a first external interface and a second external interface, the first external interface of the second converter integrated circuit being a serial interface, the second external interface of the second converter integrated circuit being a memory interface for connecting the second converter integrated circuit to a second memory die, the second converter integrated circuit being connected to the controller integrated circuit through the first converter integrated circuit.

According to an embodiment of the present disclosure, there is provided a method, including: receiving, by a first converter integrated circuit of a storage device, from a controller integrated circuit of the storage device, a packet, through a first external interface of the first converter integrated circuit, the packet including a packet header and a packet payload; and transmitting, by the first converter integrated circuit, through a second external interface of the first converter integrated circuit, the packet payload, the first external interface being a serial interface, and the second external interface being a memory interface connecting the first converter integrated circuit to a first memory die of the storage device.

In some embodiments, the first memory die is a NAND flash memory die.

In some embodiments, the first external interface is a Serial Peripheral Interface (SPI) or a Peripheral Component Interconnect Express (PCIe) interface.

In some embodiments, the packet payload includes: a first die payload for the first memory die; and a second die payload for a second memory die of the storage device, the second die payload being interleaved with the first die payload.

According to an embodiment of the present disclosure, there is provided a storage device, including: a controller integrated circuit; a first memory die; and means for converting, the means for converting having a first external interface and a second external interface, the first external interface being a serial interface, the first external interface being connected to the controller integrated circuit, and the second external interface being a memory interface connecting the means for converting to the first memory die.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a memory interface chip provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In some embodiments, in a persistent storage device, a converter integrated circuit is connected between the controller of the persistent storage device and the memory dies (e.g., flash memory dies) of the persistent storage device. The converter integrated circuit may have a serial connection (including, e.g., one or more serial lanes) to the controller and a parallel interface to each of the memory dies.

The use of a converter integrated circuit connected to the controller by a serial interface and connected to the memory dies by parallel interfaces may have several advantages over embodiments in which a controller is connected directly to a plurality of memory dies through a plurality of parallel interfaces. For example, timing skew, which may limit data rates in a parallel connection, may be unimportant in a serial connection. Moreover, the number of pads required at the controller may be significantly reduced.

Figure 1A:
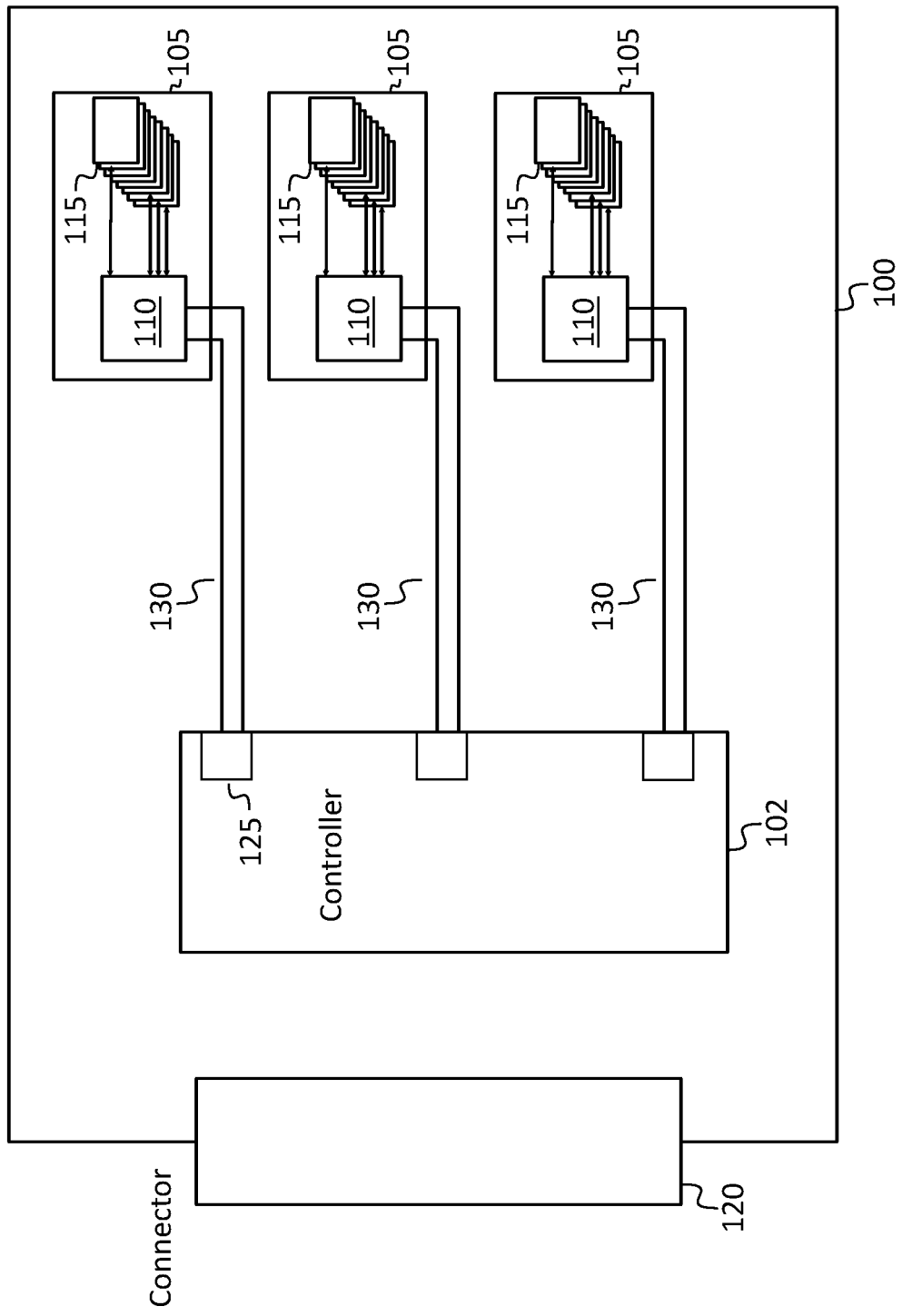
FIG. 1A is a block diagram of a persistent storage device, according to an embodiment of the present disclosure.
Figure 1B:
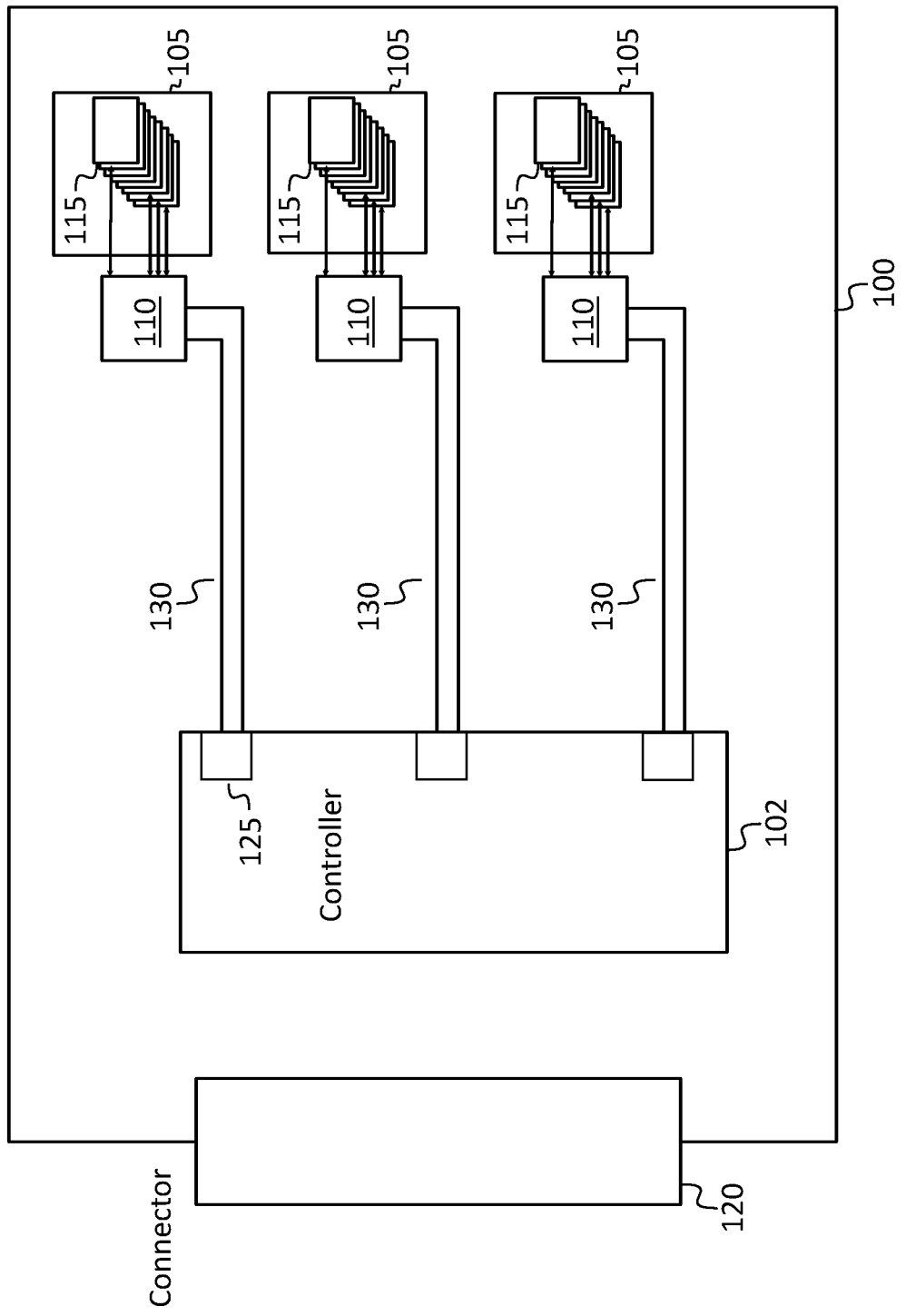
FIG. 1B is a block diagram of a persistent storage device, according to an embodiment of the present disclosure.

Referring to FIG. 1A, in some embodiments, a persistent storage device 100 includes a controller (or "controller integrated circuit") 102 and a plurality of memory packages 105, each of which may include a converter integrated circuit 110 (or "chiplet", discussed in further detail below) and a plurality of memory dies 115. The persistent storage device 100 may be connected to a host through a host interface that includes a host interface connector 120. The controller 102 may include one or more serial interface circuits 125 (which may be serializer-deserializer (SERDES) circuits) through which it may be connected, via serial connections 130, to the converter integrated circuits 110. Each of the memory dies 115 may be a flash memory die, e.g., a not-AND (NAND) flash memory die. Each of the controller 102 and the converter integrated circuit 110 may be or include a processing circuit (discussed in further detail below). In some embodiments, the converter integrated circuits 110 are located outside of the memory packages 105 (e.g., inside the persistent storage device 100, along the path from the controller 102 to the memory packages 105), as shown in FIG. 1B.

The persistent storage device 100 may have a form factor that is any one of a plurality of form factors suitable for persistent storage devices, including but not limited to 2.5", 1.8", MO-297, MO-300, M.2, U.2, U.3 and Enterprise and Data Center SSD Form Factor (EDSFF), and it may have an electrical interface, through which it may be connected to the a host, that is any one of a plurality of interfaces suitable for persistent storage devices, including Peripheral Component Interconnect (PCI), PCI express (PCIe), Ethernet, Small Computer System Interface (SCSI), Serial AT Attachment (SATA), and Serial Attached SCSI (SAS).

Figure 1C:
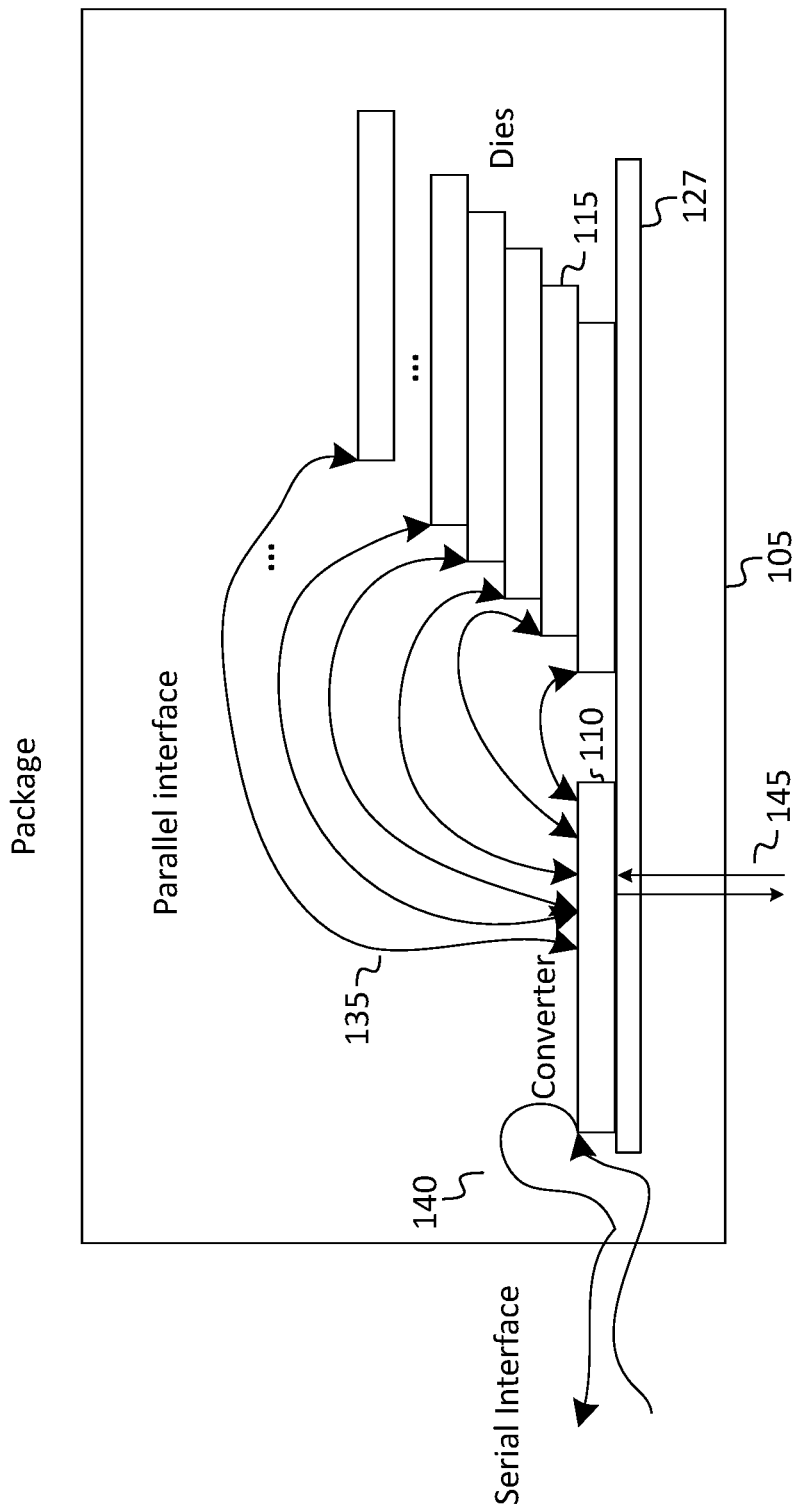
FIG. 1C is a schematic side view of a memory package, according to an embodiment of the present disclosure.
Figure 1D:
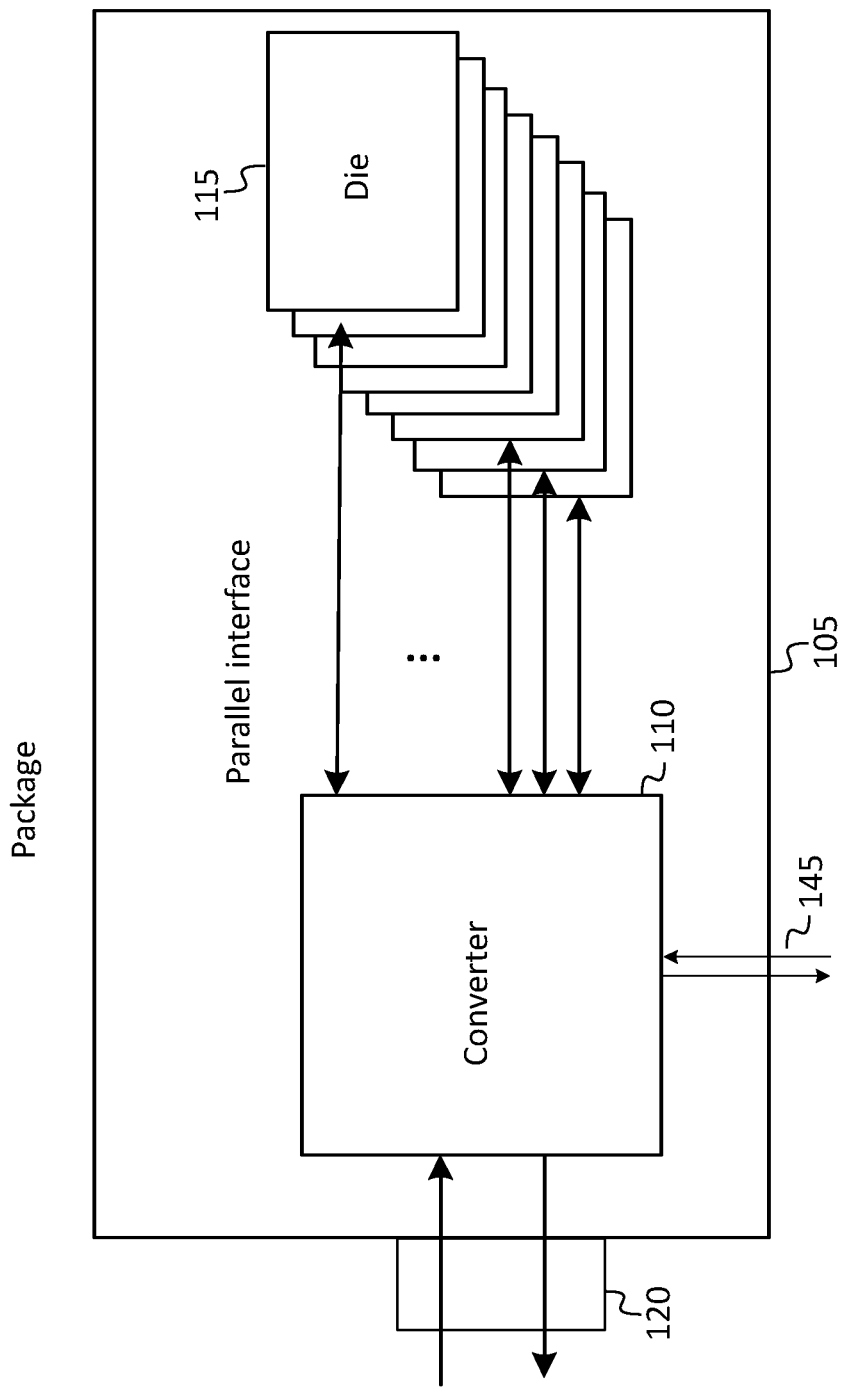
FIG. 1D is a schematic plan view of a memory package, according to an embodiment of the present disclosure.

Referring to FIGS. 1C and 1D, each memory package 105 may include (as mentioned above) a converter integrated circuit 110 and a plurality of memory dies 115. The converter integrated circuit 110 may be connected to each of the memory dies 115 by a respective parallel interface 135 (which may include one or more wire bonds each forming a connection between a wire bond pad on the converter integrated circuit 110 and a wire bond pad on the memory die 115). The converter integrated circuit 110 and the memory dies 115 may be secured to a substrate 127, which may be, e.g., a ceramic substrate or an organic substrate (e.g., a printed circuit board). The substrate may have one or more layers of conductive (e.g., metal) traces separated by insulating layers and one or more vias. A ball-grid array on the lower surface of the substrate 127 may be used to make connections to a printed circuit board of a storage device. The memory dies 115 may be stacked in a staggered fashion as shown in FIG. 1C, allowing a large number of memory dies to be placed on a small area of the substrate 127, while leaving a portion of the top surface of each of the memory dies 115 exposed so that connections (e.g., via wire bonds) may be made to each of the memory dies 115. The parallel interface 135 may be, e.g., an interface complying with the Open NAND Flash Interface (ONFI) standard or with the Toggle standard. The converter integrated circuit 110 may be connected to the controller by a serial interface 140, and it may have a forwarding serial connection 145 for forming daisy-chained connections (discussed in further detail below).

In some embodiments, the serial interface 140 between the controller 102 and each converter integrated circuit 110 is a Serial Peripheral Interface (SPI) or a PCIe interface (e.g., a simplified, e.g., mobile PCIe interface). In some embodiments, the serial interface 140 is a Universal Chiplet Interconnect Express (UCIE) interface or a short reach serial interface (e.g., an ultra short reach (USR) interface or an extra short reach (XSR) interface).

In operation, the controller 102 may send packets of bits to the converter integrated circuit 110, each packet including a packet header and a packet payload. The header may include (e.g., begin with) a start delimiter, which may be or include a string of bits that is unlikely to appear in the payload (e.g., a long (e.g., 32-bit or longer) pseudo-random binary word). The payload may include one or more die payloads including commands and data to be sent to one or more of the memory dies 115. Each of the memory dies 115 may have a respective identifier (e.g., a 4-bit identifier), which may be programmed into the memory die 115, and which may be different from the die identifiers of the other memory dies 115 in the memory package 105. Multiplexing (or "interleaving") of the die payloads may be used in the payload to reduce latency. For example, if, during an interval of time, data are being transferred from the controller 102 to three of the memory dies 115 (e.g., dies 0, 1, and 2), the payload may include interleaved respective data words for the three memory dies 115. For example the payload may include the sequence {[Data-die#0], [Data-die#1], [Data-die#2]} repeatedly (in which [Data-die#0] is a data word for die 0, [Data-die#1] is a data word for die 1, and [Data-die#2] is a data word for die 2). Each data word may be a single bit or a set of bits (e.g., 4 bits, 8 bits, 16 bits, or 32 bits). Similarly, data transferred from the memory dies 115 to the controller 102 may be interleaved, by the converter integrated circuit 110. Buffering of data received from the memory dies 115 may be performed, by the converter integrated circuit 110, to ensure that data are available as needed for any packet being sent to the controller 102. When the die payloads are interleaved, the packet header may include (i) an indicator (e.g., a bit, used as a flag), signaling that the packet payload comprises interleaved die payloads and (ii) a set of die identifiers for the dies the payloads of which are interleaved, the set of die identifiers signaling an order of interleaving in the packet payload.

Figure 2A:
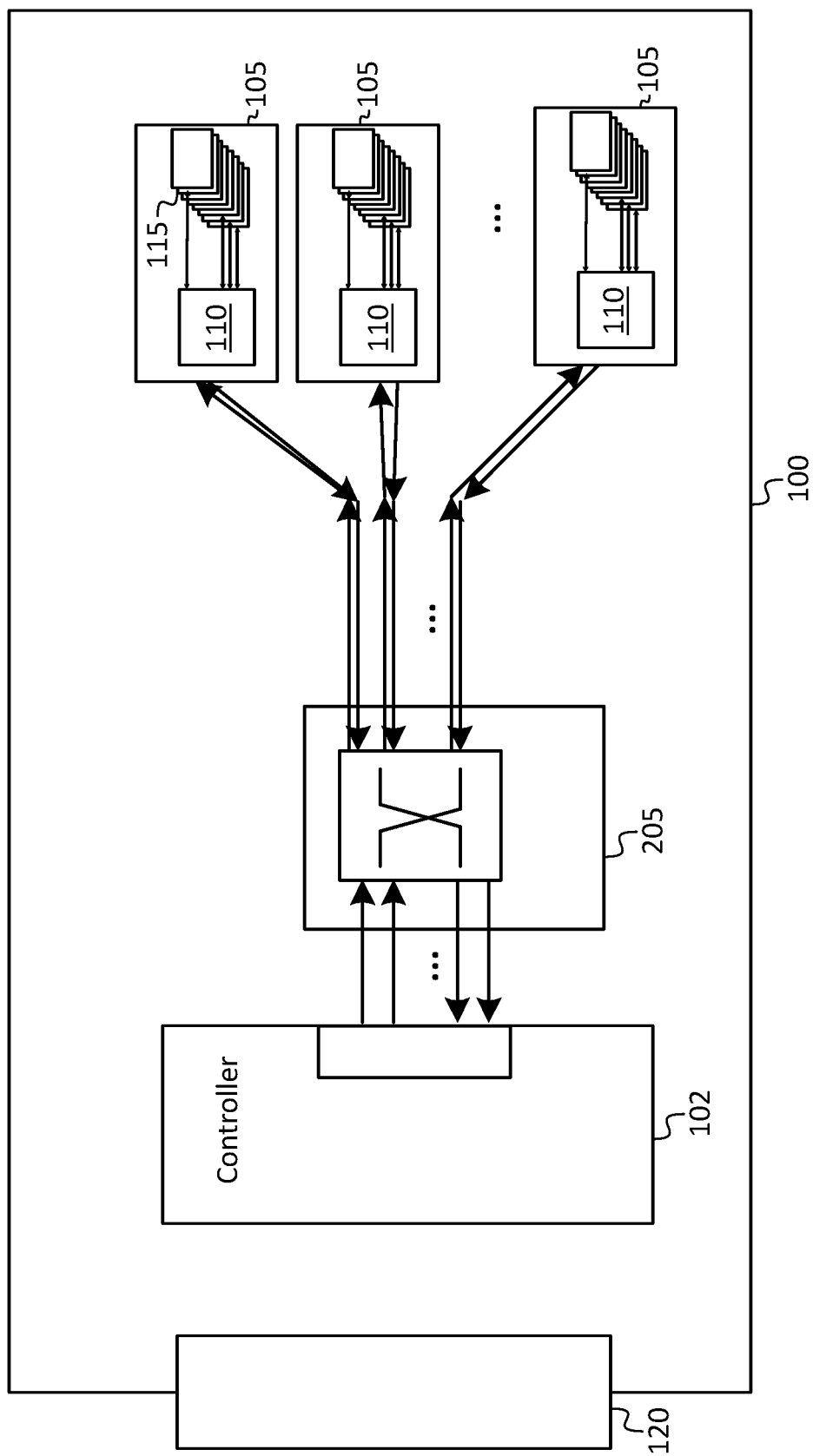
FIG. 2A is a block diagram of a persistent storage device, according to an embodiment of the present disclosure.

Referring to FIG. 2A, in some embodiments, a switch 205 may be employed to route packets from the controller 102 to the converter integrated circuits 110 in a plurality of memory packages 105, so that each of the converter integrated circuits 110 is connected to the controller 102 through the switch. In such a configuration, each packet sent by the controller 102 may include, in the header, an identifier (or "converter identifier") of the converter integrated circuit 110 to which the packet is addressed; the switch 205 may parse the header and route the packet accordingly. Each packet sent by a converter integrated circuit 110 may also include the converter identifier of the sending converter integrated circuit 110, so that the controller may be able to identify its origin. Such an embodiment may be used with or without interleaving of the data of different memory dies 115. The use of a switch may make it possible to accommodate a larger number of memory package 105 in the persistent storage device 100. The bandwidth of the connection between the controller 102 and the switch 205 may be increased by connecting the switch 205 to the controller 102 with a plurality of serial lanes (e.g., SPI lanes or PCIe lanes), as shown. In some embodiments, the switch 205 is connected to the controller 102 with a single serial lane. In some embodiments, one or more of the converter integrated circuits 110 may be outside of the corresponding memory packages 105, (e.g., they may be at the output ports of the switch 205).

Figure 2B:
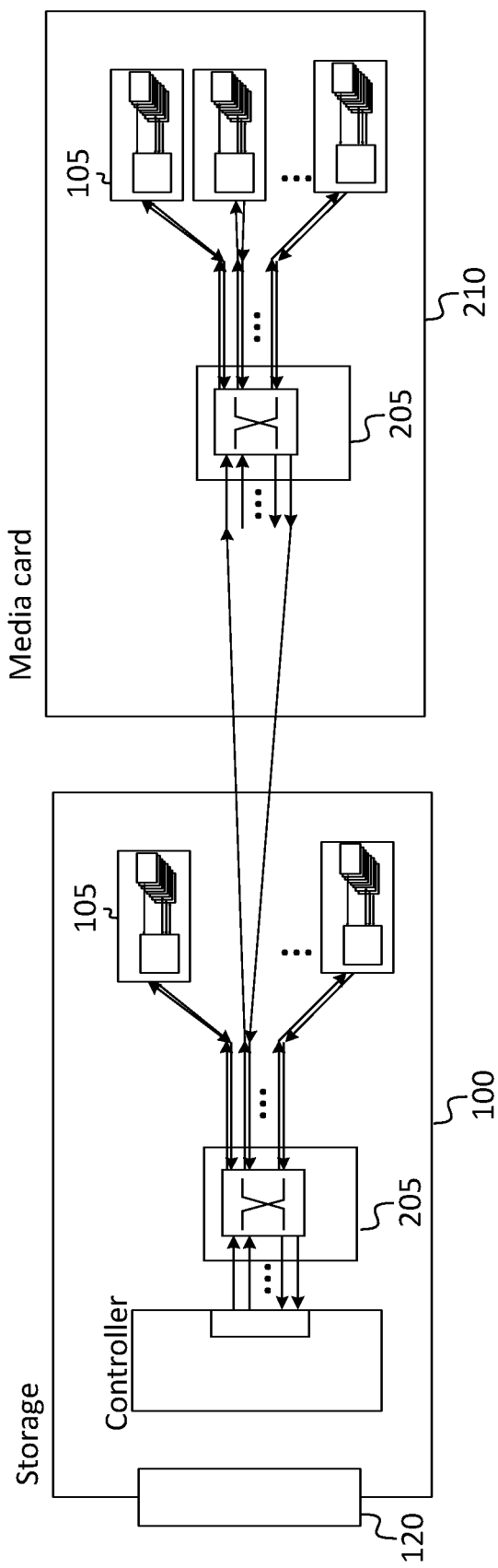
FIG. 2B is a block diagram of a persistent storage device and a media card, according to an embodiment of the present disclosure.

In some embodiments data may be multiplexed across converter integrated circuits 110, in a manner analogous to the multiplexing across memory dies 115 described above. For example, the controller 102 may repeatedly send groups of data words in the format {[data-chiplet#0], [data-chiplet#1], [data-chiplet#2]}, where [data-chiplet#0] is a data word for a first converter integrated circuit 110 ("chiplet#0"), [data-chiplet#1] is a data word for a second converter integrated circuit 110 ("chiplet#1"), and [data-chiplet#2] is a data word for a third converter integrated circuit 110 ("chiplet#2"). Multiplexing may be performed simultaneously across converter integrated circuits 110 and across memory dies 115. For example, first converter integrated circuit 110 may demultiplex the share of the data stream that the first converter integrated circuit 110 receives from the switch 205, and send a respective portion to each of a plurality of memory dies 115 to which the first converter integrated circuit 110 is connected. In some embodiments, a media card 210 including a switch 205 and a plurality of memory packages 105 may be connected to a switch 205 of the persistent storage device 100 as shown in FIG. 2B, to further expand the number of memory packages 105 that may be accommodated. The media card may be within a housing of the persistent storage device 100 or it may be separate (e.g., in a separate housing).

Figure 2C:
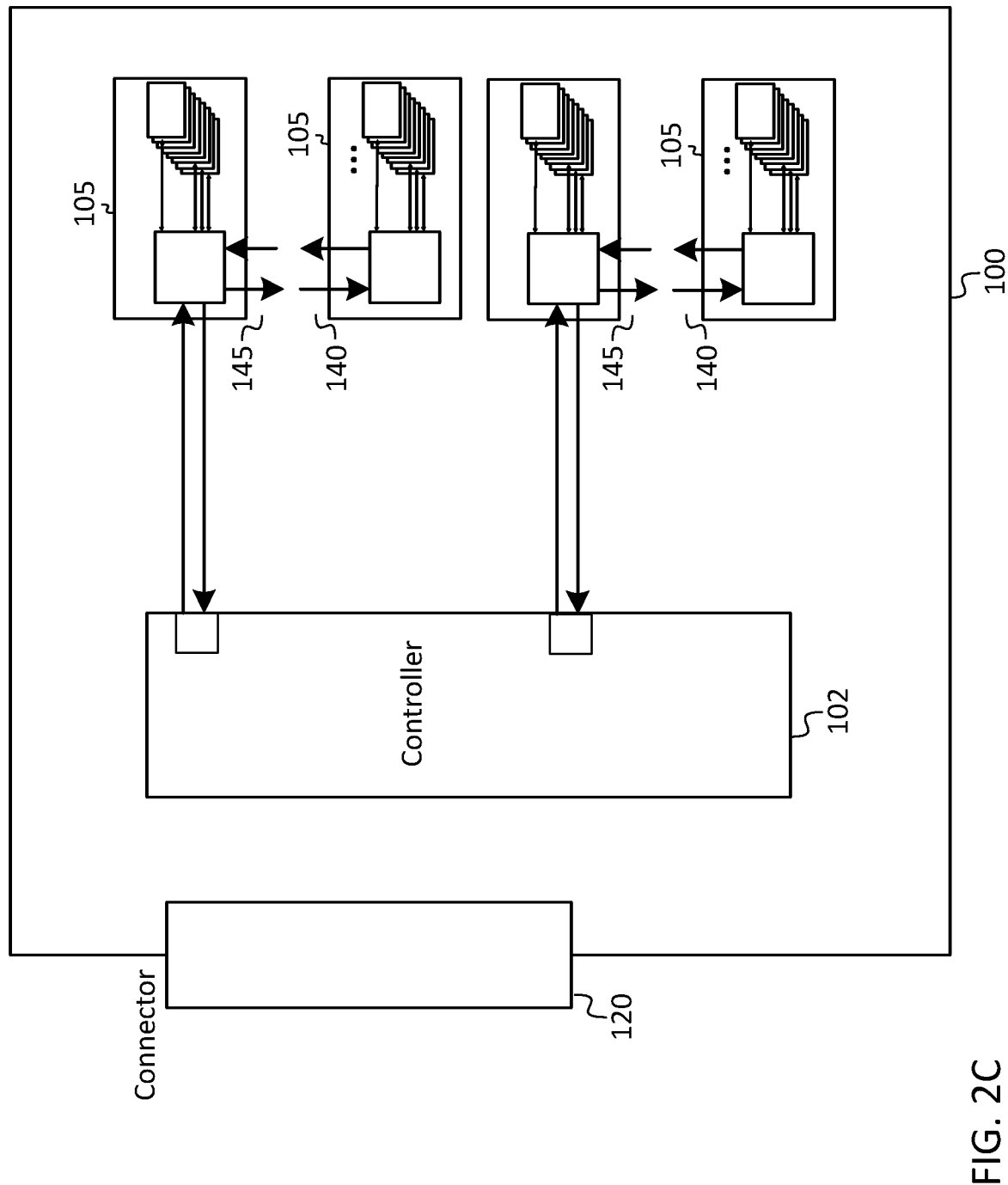
FIG. 2C is a block diagram of a persistent storage device, according to an embodiment of the present disclosure.

In some embodiments, a plurality of memory packages 105 may be daisy-chained as shown in FIG. 2C, by connecting the forwarding serial connection 145 of each of one or more of the memory packages 105 to the serial interface 140 of another memory package 105. In the embodiment of FIG. 2C, when a first converter integrated circuit 110 receives a packet at its serial interface 140, it forwards the packet through its forwarding serial connection 145 (and the other converter integrated circuits 110 in the chain behave in the same manner); in this manner each converter integrated circuit 110 in the chain receives each packet. The first converter integrated circuit 110 also parses the packet header to extract the converter identifier. If the converter identifier of the packet header matches the converter identifier of the first converter integrated circuit 110, the first converter integrated circuit 110 processes the packet (e.g., sending the payload to a memory die 115 identified in a memory die identifier field of the packet header). If the converter identifier of the packet header does not match the converter identifier of the first converter integrated circuit 110, the first converter integrated circuit 110 disregards the remainder of the packet. Each other converter integrated circuit 110 behaves in the same manner, upon receiving a packet. In this manner, the packet may be processed by the converter integrated circuit 110 in the chain having a matching converter identifier.

Figure 3:
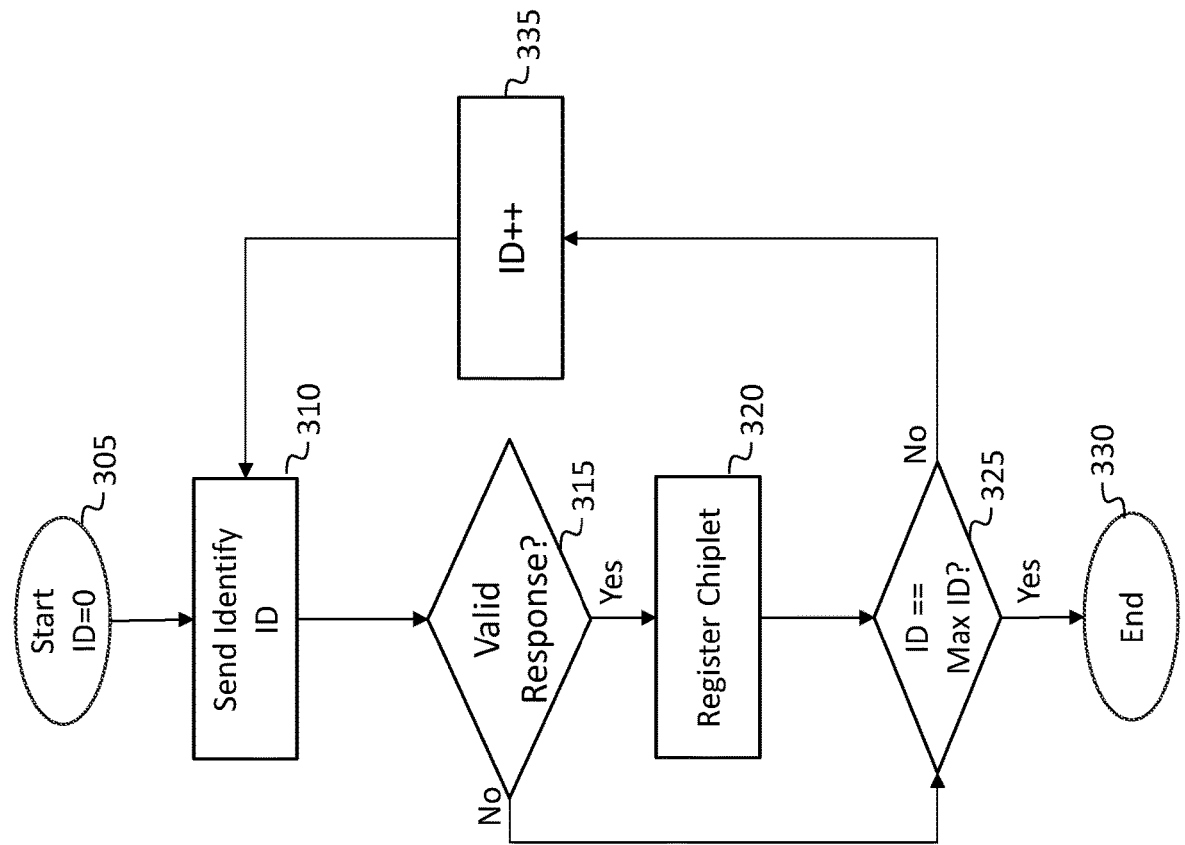
FIG. 3 is a flow chart, according to an embodiment of the present disclosure.

In some embodiments the controller 102 may perform a discovery process to determine the converter identifier of each converter integrated circuit 110 connected to it. This may be performed according to the flow chart of FIG. 3. At 305, the controller 102 initializes an identifier value, e.g., to zero. At 310, the controller 102 sends an interrogatory command (e.g., a command inquiring whether the recipient is present) to the first converter integrated circuit 110 in the chain. If, at 315, the controller 102 receives a valid response, (either from the first converter integrated circuit 110 in the chain, or from another converter integrated circuit 110 in the chain, which received it after forwarding by the first converter integrated circuit 110 in the chain) it registers the converter integrated circuit 110 (the chiplet) from which it received the response (e.g., it includes the current identifier value in a table of valid converter identifier values). The controller 102 then determines, at 325, whether it has reached the maximum possible value of the identifier value. If it has, the discovery process terminates, at 330; if it has not, it increments the identifier value at 335 and returns to step 310. If, at 315, the controller 102 does not receive a valid response, control transitions to the determining step at 325.

Figure 4:
FIG. 4 is a flow chart, according to an embodiment of the present disclosure.

FIG. 4 is a flow chart of a method, in some embodiments. The method includes, receiving, at 405, by a first converter integrated circuit of a storage device, from a controller integrated circuit of the storage device, a packet, through a first external interface of the first converter integrated circuit, the packet comprising a packet header and a packet payload; and transmitting, at 410, by the first converter integrated circuit, through a second external interface of the first converter integrated circuit, the packet payload. The first external interface may be a serial interface, and the second external interface may be a memory interface connecting the first converter integrated circuit to a first memory die of the storage device.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y%" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a memory interface chip have been specifically described and illustrated herein, many modifications and variations will be apparent to those skilled in the art. Accordingly, it is to be understood that a memory interface chip constructed according to principles of this disclosure may be embodied other than as specifically described herein. The invention is also defined in the following claims, and equivalents thereof.

What is claimed is:

1. A storage device, comprising:
a controller integrated circuit;
a first memory die and a second memory die;
a first converter integrated circuit; and
a wire bond,
the first converter integrated circuit having a first external interface and a second external interface, wherein the first converter integrated circuit is configured to receive, at the first external interface, a packet comprising an indicator and a packet payload, and wherein the indicator signals that the packet payload comprises interleaved die payloads,
the first external interface being a serial interface,
the first external interface being connected to the controller integrated circuit,
the wire bond being connected to the first converter integrated circuit and to the first memory die, and
the second external interface being a memory interface connecting the first converter integrated circuit to the first memory die.

2. The storage device of claim 1, wherein the first memory die is a NAND flash memory die.

3. The storage device of claim 2, wherein the second external interface complies with a Toggle standard or an Open NAND Flash Interface (ONFI) standard.

4. The storage device of claim 1, comprising a package comprising:
the first memory die;
the first converter integrated circuit; and
a substrate,
the first memory die and the first converter integrated circuit being secured to the substrate.

5. The storage device of claim 1, wherein the first external interface is a Serial Peripheral Interface (SPI) or a Peripheral Component Interconnect Express (PCIe) interface or Universal Chiplet Interconnect Express (UCIE).

6. The storage device of claim 1, wherein the packet comprises a packet header.

7. The storage device of claim 6, wherein the packet payload comprises a first die payload, the first die payload comprising a command or data.

8. The storage device of claim 7, wherein the packet payload further comprises a second die payload, interleaved with the first die payload.

9. The storage device of claim 8, wherein the packet payload further comprises a third die payload, interleaved with the first die payload and the second die payload.

10. The storage device of claim 9, wherein the packet header comprises the indicator signaling that the packet payload comprises interleaved die payloads.

11. The storage device of claim 9, wherein the first memory die has a first die identifier, and the second memory die has a second die identifier, different from the first die identifier.

12. The storage device of claim 11, wherein the packet header comprises the first die identifier and the second die identifier, the first die identifier and the second die identifier signaling an order of interleaving in the packet payload.

13. The storage device of claim 1, further comprising:
a second converter integrated circuit; and
a switch,
the first external interface being connected to the controller integrated circuit through the switch, and
the second converter integrated circuit being connected to the controller integrated circuit through the switch.

14. The storage device of claim 1, further comprising a second converter integrated circuit,
the second converter integrated circuit having a first external interface and a second external interface,
the first external interface of the second converter integrated circuit being a serial interface,
the second external interface of the second converter integrated circuit being a memory interface for connecting the second converter integrated circuit to the second memory die,
the second converter integrated circuit being connected to the controller integrated circuit through the first converter integrated circuit.

15. A method, comprising:
receiving, by a first converter integrated circuit of a storage device, from a controller integrated circuit of the storage device, a packet, through a first external interface of the first converter integrated circuit, the packet comprising a packet header and a packet payload, wherein the packet header comprises an indicator signaling that the packet payload comprises interleaved die payloads; and
transmitting, by the first converter integrated circuit, through a second external interface of the first converter integrated circuit, the packet payload,
the first external interface being a serial interface,
the second external interface being a memory interface connecting the first converter integrated circuit to a first memory die and a second memory die of the storage device, and
the storage device comprising a wire bond, connected to the first converter integrated circuit and to the first memory die.

16. The method of claim 15, wherein the first memory die is a NAND flash memory die.

17. The method of claim 15, wherein the first external interface is a Serial Peripheral Interface (SPI) or a Peripheral Component Interconnect Express (PCIe) interface.

18. The method of claim 15, wherein the packet payload comprises:
a first die payload for the first memory die; and
a second die payload for the second memory die of the storage device,
the second die payload being interleaved with the first die payload.

19. A storage device, comprising:
a controller integrated circuit;
a first memory die and a second memory die;
a converter; and
a wire bond,
the converter having a first external interface and a second external interface, wherein the converter is configured to receive, at the first external interface, a packet comprising an indicator and a packet payload, and wherein the indicator signals that the packet payload comprises interleaved die payloads,
the first external interface being a serial interface,
the first external interface being connected to the controller integrated circuit,
the wire bond being connected to the converter and to the first memory die, and the second external interface being a memory interface connecting the converter to the first memory die.

* * * * *